(12) United States Patent
Noda et al.

(10) Patent No.: US 7,428,352 B2
(45) Date of Patent: Sep. 23, 2008

(54) TWO-DIMENSIONAL PHOTONIC CRYSTAL AND OPTICAL FUNCTION ELEMENT USING THE SAME

(75) Inventors: Susumu Noda, Kyoto (JP); Takashi Asano, Kyoto (JP); Bong-Shik Song, Kyoto (JP); Seiichi Takayama, Chuo-ku (JP)

(73) Assignees: Kyoto University, Kyoto (JP); TDK Corporation, Tokyo (JP)

( * ) Notice: Subject to any disclaimer, the term of this patent is extended or adjusted under 35 U.S.C. 154(b) by 0 days.

(21) Appl. No.: 11/794,121

(22) PCT Filed: Dec. 28, 2005

(86) PCT No.: PCT/JP2005/024067

§ 371 (c)(1),
(2), (4) Date: Aug. 6, 2007

(87) PCT Pub. No.: WO2006/070868

PCT Pub. Date: Jul. 6, 2006

(65) Prior Publication Data
US 2008/0002931 A1 Jan. 3, 2008

(30) Foreign Application Priority Data
Dec. 28, 2004 (JP) ............................. 2004-378707

(51) Int. Cl.
G02B 6/26 (2006.01)
G02B 6/42 (2006.01)
G02B 6/10 (2006.01)

(52) U.S. Cl. .......................... 385/16; 385/131; 385/132

(58) Field of Classification Search ................... 385/16, 385/129–132
See application file for complete search history.

(56) References Cited

U.S. PATENT DOCUMENTS 6,542,682 B2 * 4/2003 Cotteverte et al. .......... 385/125
(Continued)

FOREIGN PATENT DOCUMENTS

JP A-2001-272555 10/2001
(Continued)

OTHER PUBLICATIONS

Takano et al., "Hetero Kaimen Hansha o Riyo shita Mennaigata 2D Photonic Kessho Hacho Bungoha Device no Jikken Kensho", 2004 Nen Shuki 65th Extended abstracts, the Japan Society of Applied Physics, Sep. 1, 2004, Hakko, separate vol. 3, p. 933, 3p-ZC-4.

Primary Examiner—Sung Pak
Assistant Examiner—Daniel Petkovsek
(74) Attorney, Agent, or Firm—Oliff & Berridge, PLC

(57) ABSTRACT

An object of the present invention is to provide a two-dimensional photonic crystal which can be used for optical path changeover switches or the like to allow switching of a path. A first area 121 and a second area 122 provided with holes 131 and 132 having a difference in the period and size are created on a body 11, and a main waveguide 15 is formed to obliquely cross a boundary 14 between these areas. A branch waveguide 17 branched from the main waveguide 15 into the first area 121 side is also formed by using a crossing point between the main waveguide 15 and the boundary 14 as a starting point. The second area 122 is heated to change a refractive index of the body within the area, so that a frequency band which can be passed through the main waveguide 15 of the second area 122 is changed. Light having a specific frequency and propagated through the main waveguide 15 from the first area 121 side is switched to be extracted from the main waveguide 15 on the second area 122 side or to be extracted from the branch waveguide 17 without propagating the main waveguide 15 on the second area 122, in response to whether or not the heating is performed.

18 Claims, 4 Drawing Sheets

U.S. PATENT DOCUMENTS

| | | | |
|---|---|---|---|
| 6,640,034 B1 * | 10/2003 | Charlton et al. | 385/122 |
| 6,674,949 B2 * | 1/2004 | Allan et al. | 385/129 |
| 6,697,542 B2 * | 2/2004 | Platzman et al. | 385/5 |
| 6,738,551 B2 | 5/2004 | Noda et al. | 385/130 |
| 7,123,804 B2 * | 10/2006 | Baba et al. | 385/129 |
| 7,215,842 B2 * | 5/2007 | Sakai et al. | 385/16 |
| 2002/0009277 A1 | 1/2002 | Noda et al. | 385/130 |

FOREIGN PATENT DOCUMENTS

| | | |
|---|---|---|
| JP | A-2002-303836 | 10/2002 |
| JP | A-2004-233941 | 8/2004 |
| JP | A-2004-334190 | 11/2004 |
| JP | A-2005-077710 | 3/2005 |
| JP | A-2005-275161 | 10/2005 |

\* cited by examiner

TWO-DIMENSIONAL PHOTONIC CRYSTAL AND OPTICAL FUNCTION ELEMENT USING THE SAME

TECHNICAL FIELD

The present invention relates to a two-dimensional photonic crystal used for optical devices such as optical switches and electro-optic modulators. It should be noted that the term "light" or "optical" used in this patent application includes electromagnetic waves in general as well as visible light.

BACKGROUND ART

Since optical communication is a technique that could play a central role in future broadband communications, the optical components used in optical communication systems are required to be higher in performance, smaller in size, and lower in price for widespread use of the optical communication. Optical communication devices (optical function element) using photonic crystals are one of the leading candidates for the next-generation optical communication components that satisfy the above-described requirements. Some of the optical communication devices have already been put into practical use, and an example is a photonic crystal fiber for polarized light dispersion compensation. Furthermore, recent efforts have had a practical goal of developing optical function elements such as optical multiplexers/demultiplexers used for wavelength division multiplexing (WDM) communication, electro-optical modulators for performing conversion between an electric signal and an optical signal, and optical switches for controlling optical on/off of light.

A photonic crystal is a dielectric object having a period structure. Usually, the period structure is created by providing the dielectric body with a periodic arrangement of modified refractive index areas, i.e. the areas whose refractive index differs from that of the body. Within the crystal, the period structure creates a band structure with respect to the energy of light and thereby produces an energy region in which the light cannot be propagated. Such an energy region is called the "photonic band gap (PBG)".

Providing an appropriate defect in the photonic crystal creates a specific energy level ("defect level") within the PBG, and only a ray of light having a frequency (wavelength) corresponding to the defect level is allowed to be present in the vicinity of the defect. A defect created in a point pattern can function as an optical resonator that resonates with light having the frequency, and a linear defect enables the crystal to be used as a waveguide.

As an example of the above-described technique, Patent Document 1 discloses a two-dimensional photonic crystal having a body (or slab) made by materials whose refractive index is higher than that of air and provided with a periodic arrangement of modified refractive index areas, in which a linear defect of the periodic arrangement is created to form a waveguide and a point-like defect is created adjacent to the waveguide. This two-dimensional photonic crystal functions as the following two devices: a demultiplexer for extracting a ray of light whose frequency equals the resonance frequency of the resonator from rays of light having various frequencies and propagated through the waveguide and for sending the extracted light to the outside; and a multiplexer for introducing the same light from the outside into the waveguide.

Patent Document 2 discloses a two-dimensional photonic crystal in which the body is divided into a plurality of areas and a waveguide passing through the plurality of the areas is formed with a different period and size of modified refractive index areas provided in each of the areas so that light is allowed to pass through the waveguide in each of the areas with a different frequency band. In this construction, light whose frequency is included in a frequency band for passing through the waveguide of a certain area (i.e. first area) and not included in the frequency band for passing through the waveguide of an area adjacent to the area (i.e. second area) cannot be propagated from a waveguide of the first area to a waveguide of the second area, and reflected in a boundary between these areas. A resonator which resonates with light of the above-described frequency is provided in the vicinity of the waveguide of the first area, so that the light of this frequency propagated through the waveguides is reflected in the above-described boundary and extracted by the above-described resonator even if the light passes through without being introduced into the resonator. Therefore, a multiplexing efficiency is enhanced.

Patent Document 3 discloses an optical switch, in which a current is not injected/injected to a two-dimensional photonic crystal having a waveguide formed by a method similar to that of Patent Document 1 so that light of a predetermined frequency can be controlled to propagate/not to propagate (or on/off of light) can be controlled. An operation principle of the optical switch is as follows. When the current is not injected, light whose frequency is within the PBG is unable to be present in the body and locked within the waveguide to propagate through the waveguide (i.e. on-state). When the current is injected, the PBG is changed in accordance with a refractive index change of the body, so that the light having the frequency leaks from the waveguide to its surrounding body and fails to propagate the waveguide (i.e. off-state). It is also possible to set an off-state when the current is not injected to the two-dimensional photonic crystal and an on-state when the current is injected thereto, by adjusting materials (or refractive index) of the body and the period of the modified refractive index areas.

[Patent Document 1] Unexamined Japanese Patent Publication No. 2001-272555 ([0023]-[0027], [0032], FIGS. 1, and 5-6)

[Patent Document 2] Unexamined Japanese Patent Publication No. 2004-233941 ([0050]-[0053], FIG. 3)

[Patent Document 3] Unexamined Japanese Patent Publication No. 2002-303836 ([0022], [0028]-[0043], FIGS. 3-4)

DISCLOSURE OF THE INVENTION

Problem to be Solved by the Invention

The construction of the optical switch according to Patent Document 3 cannot be applied to an optical switch for switching an optical path.

One objective of the present invention is to provide a two-dimensional photonic crystal which can be used for an optical path changeover switch to allow switching of a path.

Means for Solving the Problem

A first aspect of the two-photonic crystal achieved to solve the above-described problem according to the present invention is characterized it comprises:

a) a first area and a second area created to be adjacent from each other within a slab-shaped body and provided with a different refractive index distribution;

b) a main waveguide obliquely intersecting a boundary between the above-described both areas, having a first passing frequency band in the first area and a second passing frequency band in the second area, in which the first passing frequency band and the second passing frequency band have a common passing frequency band;

c) a branch waveguide branched from a crossing point between the main waveguide and the above-described boundary into the first area; and d) refractive index changing means for changing refractive index distribution of the first area or the second area so as to change the above-described common passing frequency band.

A second aspect of the two-photonic crystal according to the present invention is characterized it comprises:

a) a first area and a second area created to be adjacent from each other within a slab-shaped body and provided with a different refractive index distribution;

b) a main waveguide obliquely intersecting a boundary between the above-described both areas, having a first passing frequency band in the first area and a second passing frequency band in the second area;

c) a branch waveguide branched from a crossing point between the main waveguide and the above-described boundary into the first area; and d) refractive index changing means for changing the refractive index distribution of the first area or the second area so that the first passing frequency band and the second passing frequency band have a common passing frequency band.

It is desirable that an area whose refractive index distribution is changed is the second area.

The refractive index distribution of the second area can be realized by proportional expansion or proportional reduction of the refractive index distribution of the first area. Therefore, the first passing frequency band and the second passing frequency band can be established as described above.

The above-described refractive index changing means can be realized by using any of a thermo-optical effect, electro-optical effect, magneto-optical effect, nonlinear optical effect, and application effect. Here, the thermo-optical effect is an effect in which refractive index distribution of the areas is changed by adding heat so that optical characteristics of the areas are changed as a result, or more specifically refractive index changing means using the thermo-optical effect can be exemplified by means for irradiating a laser beam to the second area to heat the area, and a heating member provided in the vicinity of the second area. Similarly, the electro-optical effect and the magneto-optical effect are an effect in which the refractive index distribution of the areas is changed by applying an electrostatic field and an oscillating electric field, or a magnetostatic field and an oscillating magnetic field so that optical characteristics of the areas are changed as a result. Furthermore, the nonlinear optical effect is an effect in which a refractive index, which does not usually depend on a light intensity, is changed when a strong light is made incident. The application effect is an effect in which the refractive index distribution is changed in accordance with a change of a stress generated in the inside of the areas due to a dynamic force applied from the outside so that the optical characteristics of the areas are changed as a result.

The two-dimensional photonic crystal according to the present invention can be used as optical switches, electro-optical modulators and optical intensity modulators. Among these devices, the electro-optical modulators uses the above-described refractive index changing means for changing the refractive index distribution of the second area by generating an electric field to be changed in accordance with an electric signal from the outside. The optical intensity modulators also use the two-dimensional photonic crystal having the second passing frequency band whose common frequency band includes a band which does not have a maximum value of light in the passing intensity either before or after or both before and after changing the refractive index distribution as described above.

EXPLANATION OF NUMERALS

Figure 1:
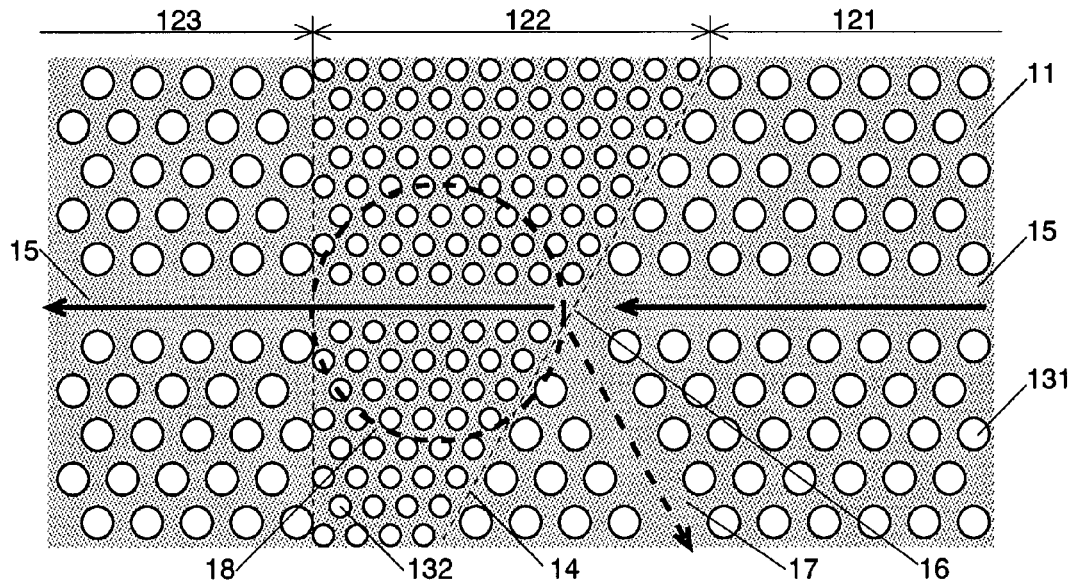
FIG. 1 is a plane view showing a first embodiment of a two-dimensional photonic crystal according to the present invention.

11, 21 . . . Body
121, 221 . . . First area
122, 222 . . . Second area
123, 223 . . . Third area
131, 132 . . . Hole
14, 24 . . . Boundary between first area and second area
15, 25 . . . Main waveguide
16, 26 . . . Crossing point between boundary and main waveguide
17, 27 . . . Branch waveguide
18, 28 . . . Control light irradiating area
31a, 31b, 31c, 31d . . . First passing frequency band
32a, 32a', 32b, 32b', 32c, 32c', 32d . . . Second passing frequency band
33a, 33a', 33b, 33b', 33c' . . . Common frequency band
34a, 34b, 34c, 34d . . . Switch frequency
35d, 36d . . . Variable band

MODES FOR CARRYING OUT THE INVENTION AND THEIR EFFECTS

The two-dimensional photonic crystal according to the present invention has two areas including a first area and a second area that are created in a body and provided with mutually different refractive index distribution. It can be created by using a plate-shaped slab in the body and providing the body with, for example, a periodic arrangement of modified refractive index areas, i.e. areas whose refractive index differs from that of the body, as the refractive index distribution, in the same manner with the conventional two-dimensional photonic crystal. It is desirable that the modified refractive index areas are created by providing holes in the body because this design is easier to manufacture and provides a larger refractive index difference with respect to the body.

The body is provided with a waveguide which obliquely crosses a boundary between the first area and the second area. This waveguide is called the main waveguide. The main waveguide can be formed by providing a defect of the refractive index distribution along a straight line in the same manner with the conventional two-dimensional photonic crystal. In the two-dimensional photonic crystal, a passing frequency band, i.e. a frequency band to allow light to propagate or pass through the waveguide, is changed not only by parameters of the waveguide itself such as the width of the waveguide but also by parameters on the body side such as the period of refractive index distribution of the body. Therefore, in the two-dimensional photonic crystal according to the present invention, a first passing frequency band being a passing frequency of the first area generally differs from a second passing frequency being a passing frequency band of the second area. According to a first aspect of the two-dimensional photonic crystal, the above-described parameters in the first area and the second area are set for the first passing frequency band and the second passing frequency band to have a common band (i.e. common passing frequency band).

According to a second aspect of the two-dimensional photonic crystal, the first passing frequency band and the second passing frequency band do not have the common passing frequency band. Except for this point, it is similar to the above-described first aspect of the two-dimensional phonic crystal.

Both the first aspect and the second aspect of the phonic crystal are provided with a waveguide which is branched from a crossing point between the main waveguide and the above-described boundary into the first area. This waveguide is called the branch waveguide.

There is also provided refractive index changing means for changing refractive index distribution of the first area or the second area so as to change the above-described common passing frequency band. The refractive index distribution here may be realized by changing an entire refractive index (having distribution) of the first area or the second area, or may be realized by changing a part of elements of which the refractive index distribution is composed. For example, if the refractive index distribution is formed by providing the body with a periodically embedded member, which differs from that of the body, a refractive index of the body and a refractive index of the member may be both changed, or only one of them may be changed. If the refractive index distribution is formed by a periodic arrangement of holes created in the body, the refractive index of the body may be exclusively changed. Detailed example of the refractive index changing means will be described later.

The two-dimensional photonic crystal thus constructed according to the present invention functions as an optical switch with respect to light propagated through the main waveguide from the first area side toward the second area side. Explanation will be made for a frequency of light to be switched (referred to as the "switch frequency" hereinafter) in the cases divided as follows: (1) the case where the switch frequency is included in the common passing frequency band before changing the refractive index distribution of the first area or the second area; and (2) the case where the switch frequency is not included in the common passing frequency band before changing the refractive index distribution.

(1) The case where the switch frequency is included in the common passing frequency band before changing the refractive index distribution:

In this case, light of the switch frequency is capable of passing through the main waveguide on both the first area side and the second area side before changing the refractive index, so that the light propagated through the main waveguide from the first area can be extracted from the second area side. When the common passing frequency band is changed by changing the refractive index distribution of the first area or the second area, a part of the first passing frequency band obtained before the change deviates from the common passing frequency band. If the switch frequency is set within the changed portion of the common passing frequency band, light of the switch frequency cannot be propagated through the main waveguide on the second area side and reflected in the above-described boundary. This reflection light is introduced into the branch waveguide without returning to the first area side of the main waveguide as it is because the above-described boundary obliquely intersects with the main waveguide. Light of the switch frequency propagated through the main waveguide from the first area side toward the second area side is thus switched to pass through the main waveguide on the second area side or to pass through the branch waveguide on the first area side, before and after changing the refractive index distribution.

(2) The case where the switch frequency is not included in the common passing frequency band before changing the refractive index:

In this case, light of the switch frequency cannot pass through the main waveguide on the second area side and introduced into the branch waveguide before changing the refractive index distribution. When the common passing frequency band is changed by changing the refractive index distribution of the first area or the second area, a part of the first passing frequency band which was not included in the common passing frequency band before the change is made to be included in the common passing frequency band. Setting the switch frequency to be included in the band allows light of the switch frequency to propagate the main waveguide on the second area side after the change. The light of the switch frequency propagated through the main waveguide from the first area side toward the second area side is thus switched to pass through the branch waveguide or to pass through the main waveguide on the second area side, before and after changing the refractive index distribution.

The two-dimensional photonic crystal of a first aspect generates the switching in both above-described cases of (1) and (2), while the two-dimensional photonic crystal of a second aspect generates the switching in the above-described case (2) in which the common passing frequency band does not exist before changing the refractive index distribution and the common passing frequency band is generated after the change. The two-dimensional photonic crystal of the both cases functions as a light path changeover switch in which a path can be switched between the branch waveguide and the main waveguide on the second area side. It can also be an optical on/off switch by which light can be switched to be passed through or to be cut off in either the branch waveguide or the main waveguide on the second area side.

The two-dimensional photonic crystal according to the present invention can also be an electro-optical modulator to convert on/off of an electric signal to on/off of light by using the refractive index changing means for changing the refractive index of the first area or the second area in accordance with on/off of an electric signal from the outside.

It is possible to form a common frequency band in a part of the first passing frequency band and the second passing frequency band by realizing the refractive index distribution and the main waveguide of the second area through proportional expansion or proportional reduction of those of the first area.

Within the first and second passing frequency bands, substantially 100% of light of the waveguide can be passed through in almost all frequencies within the bands. However, a partial band obtained in the vicinity of an end of the passing frequency bands (referred to as the "variable band" hereinafter) have a propagation efficiency of the waveguide which is equal to or less than 100%. Using this variable band allows intensity modulation of light propagated through the waveguide. That is, the common frequency band is made to include the variable band, and the switch frequency is made to be included therein, either before or after or both before and after changing the refractive index distribution. In this case, the light intensity of the switch frequency is changed in the main waveguide on the second area side or the branch waveguide side before and after changing refractive index distribution of the first area or the second area. Accordingly, the two-dimensional photonic crystal of this embodiment can be used as an optical intensity modulator in which the intensity of light can be controlled by changing the refractive index distribution of the first area or the second area.

Explained next will be the refractive index changing means. For changing the refractive index distribution of the first area or the second area, the above-described thermo-optical effect, electro-optical effect, magneto-optical effect, nonlinear optical effect or application effect can be used.

As an example of the refractive index changing means using the thermo-optical effects, means for irradiating a strong light to an area whose refractive index is changed can be enumerated. In this case, it is desirable to use a laser beam as a light source of irradiated light so as not to change temperatures of an area which is not irradiated by light. In order to promptly return a temperature of an area irradiated by light to an original temperature when the irradiated light is turned off, the area may be brought into contact with a low-temperature heat bath.

As another example of the refractive index changing means using the thermo-optical effect, heating members provided in the vicinity of an area whose refractive index is changed can be enumerated. For example, a very small member such as a probe of an atomic force microscope is arranged immediately above an area whose refractive index is changed, and the area whose refractive index is changed is exclusively heated in the vicinity of the very small member by heating the very small member, so that it is made possible to suppress a temperature change in the area separated from the micro members and whose refractive index is not changed.

As yet another example of the refractive index changing means using the thermo-optical effect, heaters disposed in the outside of a portion having period refractive index distribution of an area whose refractive index is changed can be enumerated.

The thermo-optical effect is generated commonly in materials such as Si and InGaAsP to be used for the two-dimensional photonic crystal so that a special material is not required to utilize the effect.

As an example of the refractive index changing means using the electro-optical effect, means for applying an electric field to an area whose refractive index is changed and turning on/off the electric field in accordance with an external signal can be enumerated. Materials having the electro-optical effects including $LiNbO_3$ or the like are used as a material of the body to realize the present invention. Similarly, for the refractive index changing means using the magneto-optical effect, means for applying a magnetic field to an area whose refractive index is changed and turning on/off the magnetic field in accordance with an external signal can be used. Materials having the magneto-optical effect including yttrium iron garnet or the like are used as a material of the body to realize the present invention.

For the refractive index changing means using the nonlinear optical effect, means for irradiating light to an area whose refractive index is changed in accordance with an external signal can be used. Materials having the nonlinear optical effect including $LiTaO_3$ or the like are used as a material of the body to realize the present invention.

For the refractive index changing means using the application effect, means such as micro actuators and the above-described very small members for applying a force to an area whose refractive index is changed can be used. The application effect is generally observed in materials used for the two-dimensional photonic crystal and thereby a special material is not required to utilize this effect.

Although an area whose refractive index is changed may be either the first area or the second area as described above, it is desirable to change the refractive index of the second area because the second area, in which the branch waveguide is not formed, can be made smaller than the first area.

Embodiments

FIG. 1 shows a first embodiment of the two-dimensional photonic crystal according to the present invention. In the present embodiment, a plate-shaped body 11 is divided into three areas 121, 122 and 123. The same materials as those of the conventional two-dimensional photonic crystal, such as Si and InGaAsP, are used as a material of the body. The area 121 is applicable to the above-described first area, and the area 122 is applicable to the above-described second area. Moreover, the area 123 is called the third area. Each of the first area 121 and the third area 123 has a triangular lattice pattern created by a large number of circular holes 131 each having the same diameter in the same period. In the second area 122, a triangular lattice pattern is arranged by a large number of holes 132 being smaller than the holes 131 in the smaller period than that of the first area 121 and the third area 123. The size and period of the holes of the second area 122 are realized by proportionally reducing those of the first area 121.

A linear space without having the period structure by the holes 131 and 132 is created by passing through the first area 121, the second area 122 and the third area 123 and obliquely intersecting a boundary 14 between the first area 121 and the second area 122 (i.e. passing through the boundary by forming an angle except for 90 degrees). This linear space (i.e. linear defect) becomes a main waveguide 15. The above-described angle is assumed to be 60 degrees in the present embodiment. There is also formed a branch waveguide 17 extended from a crossing point 16 between the main waveguide 15 and the boundary 14 toward the first area 121 side at an angle of 60 degrees with respect to the main waveguide 15 and the boundary 14.

Moreover, control light irradiating means (not shown) is provided to irradiate a laser beam (i.e. control light) to a control light irradiating area 18 which is disposed within the second area 122 and has a diameter practically the same with the length of the main waveguide 15 of the area as indicated within a circle of a broken line shown in FIG. 1. This control light irradiating means turns on/off irradiation of control light to the control light irradiating area 18 in order to control temperatures in the area, so that a refractive index of the body is changed within the area. If a material of the body 11 is Si having a refractive index of 3.4 at room temperatures, a temperature is increased by irradiating the control light to the control light irradiating area 18 and thereby a refractive index of the second area 122 can be increased. The diameter of the control light irradiating area 18 is made by about eight periods of the holes as shown in FIG. 1 for example, and about 300 μm if the period of the holes is determined so as to propagate light of a 1.5 μm band through the main waveguide 15.

Since the third area 123 has the same construction with the first area 121, a passing frequency band which is the same with that of the core bandwidth 15 of the first area 121 is provided. Accordingly, light which is capable of passing through the main waveguide 15 of the first area 121 is allowed to pass through the main waveguide 15 of the third area 123 as it is as long as the light is capable of passing through the main waveguide 15 of the second area 122. This third area 123 plays a role as an outlet port of the light which passed through the main waveguide 15 of the second area 122.

Figure 2:
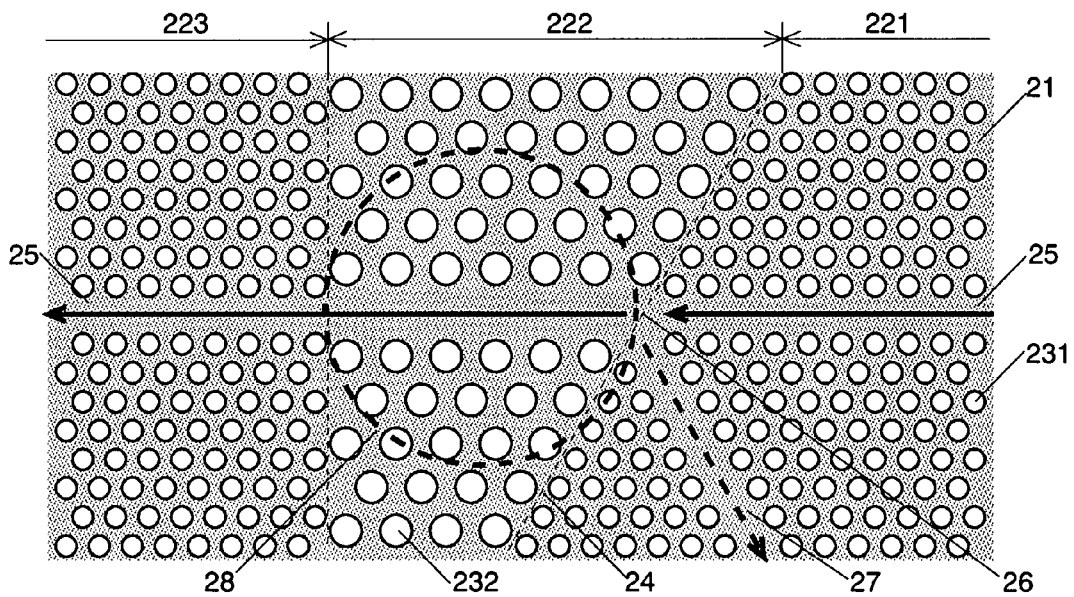
FIG. 2 is a plane view showing a second embodiment of the two-dimensional photonic crystal according to the present invention.

FIG. 2 shows a second embodiment of the two-dimensional photonic crystal according to the present invention. In the second embodiment, a body 21 is divided into three areas including a first area 221, a second area 222 and a third area 223 in the same manner with the first embodiment, in which each of the first area 221 and the third area 223 has a triangular lattice pattern created by a large number of circular holes 231 each having the same diameter in the same periods. In the second area 222, a large number of holes 232 being larger than the holes 231 is arranged in a triangular lattice pattern in a larger period than that of the first area 221 and the third area 223. The size and period of the holes of the second area 222 are realized by proportionally expanding those of the first area 221. A main waveguide 25, a branch waveguide 27, and the control light irradiating means are also provided in the same manner with the first embodiment.

Figure 3:
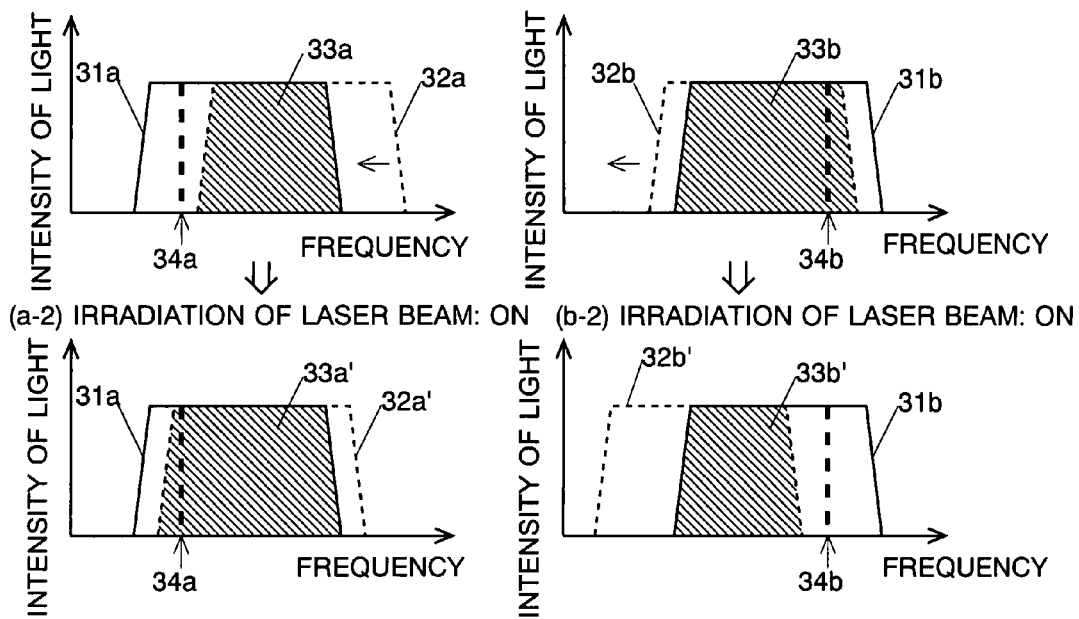
FIG. 3 is a graph showing a frequency band for passing through the waveguide of the two-dimensional photonic crystal according to the present embodiment.

An operation of the two-dimensional photonic crystals according to the first and second embodiments will be explained using FIG. 3. FIG. 3a-1 and FIG. 3a-2 show an operation of the two-dimensional photonic crystal of the first embodiment, while FIG. 3b-1 and FIG. 3b-2 show an operation of the two-dimensional photonic crystal of the second embodiment.

In the two-dimensional photonic crystal of the first embodiment, a passing frequency band (i.e. second passing frequency band) 32a of the main waveguide 15 on the second area 122 side is formed on a side having a higher frequency (or shorter wavelength) than a passing frequency band (i.e. first passing frequency band) 31a of the main waveguide 15 on the first area 121 side as shown in FIG. 3a-1, due to the difference in the period and size of the holes between the first area 121 and the second area 122 as described above. A common frequency band 33a is present in the first passing frequency band 31a and the second passing frequency band 32a. The second area 122 is heated by irradiating the control light to the area, and a refractive index of the body 11 in the second area 122 is increased and thereby the second passing frequency band 32a is shifted to a lower frequency (or longer wavelength) side as indicated by a second passing frequency band 32a' shown in FIG. 3a-2. Meanwhile, the first passing frequency band 31a remains the same without any changes. Therefore, the common frequency band is made larger than the state obtained before irradiating the control light as indicated by a common frequency band 33a'.

Here, a frequency 34a which is not included in the common frequency band 33a but included in the common frequency band 33a' is assumed to be a switch frequency. Light having the switch frequency 34a is propagated through the waveguides (i.e. the main waveguide 15 and the branch waveguide 17) as follows when the light is introduced from the first area 121 side to the main waveguide 15. The light cannot pass through the main waveguide 15 on the second area 122 side before irradiating the control light because the switch frequency 34a is not included in the common frequency band 33a. Therefore, the light is reflected in the boundary 14 and introduced into the branch waveguide 17. The switch frequency 34a is included in the common frequency band 33a after irradiating the control light, so that the light is introduced into the main waveguide 15 within the second area 122 by passing through the boundary 14 and extracted from the third area 123 side. The two-dimensional photonic crystal of the first embodiment thus functions as a path changeover switch for switching a light path of the switch frequency 34a from the branch waveguide 17 to the main waveguide 15 on the third area 123 side by irradiating the control light. It also functions as an optical on/off switch to be seen from either the branch waveguide 17 or the main waveguide 15 on the third area 123 side.

In the two-dimensional photonic crystal of the second embodiment, a second passing frequency band 32b is formed on a side having a lower frequency (or longer wavelength) than a first passing frequency band 31b as shown in FIG. 3b-1. Irradiating the control light to the second area 122 causes the second passing frequency band 32b to be shifted to a side having a lower frequency (or longer wavelength) as indicated by a second passing frequency band 32b' shown in FIG. 3b-2. Therefore a common frequency band 33b is made smaller as indicated by a common frequency band 33b'.

Light having a switch frequency 34b, which is included in the common frequency band 33b but not included in the common frequency band 33b', is propagated through the waveguides (i.e. the main waveguide 15 and the branch waveguide 17) as follows when the light is introduced from the first area 121 side to the main waveguide 15. Before irradiating the control light, the light is introduced into the main waveguide 15 on the second area 122 side by passing through the boundary 14 and extracted from the third area 123 side, because the switch frequency 34b is included in the common frequency band 33b. Meanwhile, the light is reflected in the boundary 14 and introduced into the branch waveguide 17 after irradiating the control light because the switch frequency 34b is not included in the common frequency band 33b'. The two-dimensional photonic crystal of the first embodiment thus functions as a path changeover switch for switching a light path of the switch frequency 34b from the main waveguide 15 on the third area 123 side to the branch waveguide 17 by irradiating the control light. This operation is exactly opposite to that of the first embodiment. An operation as an optical on/off switch is also exactly opposite to that of the first embodiment.

Figure 4:
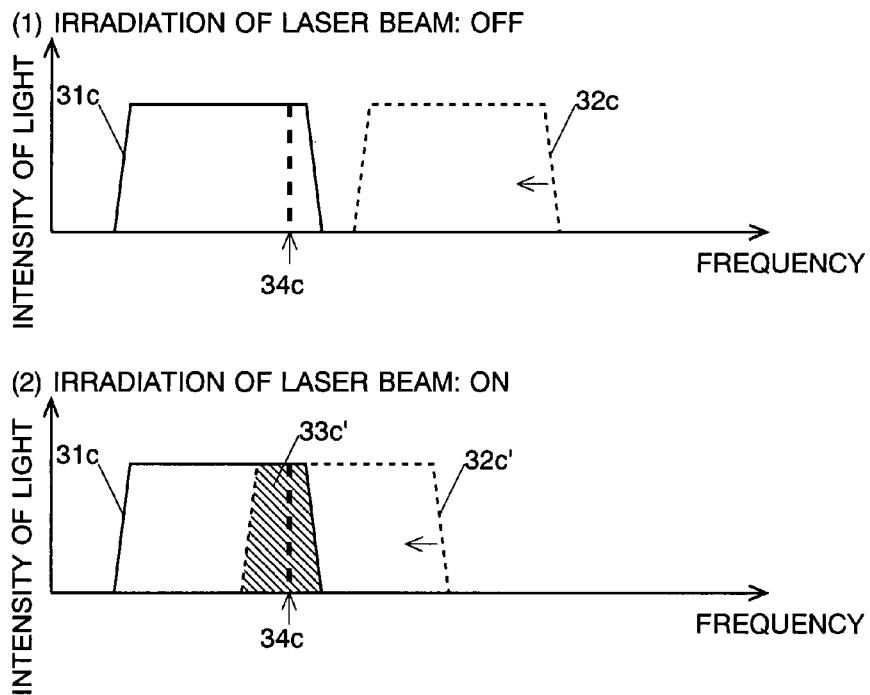
FIG. 4 is a graph showing the frequency band for passing through the waveguide of the two-dimensional photonic crystal according to the present embodiment (without having a common frequency band when a control light is turned off).

If the first area and the second area have a large difference in the period and size of the holes, there is a case that the first passing frequency band 31c and the second passing frequency band 32c do not have a common frequency band as shown in FIG. 4(1). In this case, the second passing frequency band is shifted by changing the refractive index distribution of the second area, so that the first passing frequency band 31c and a second passing frequency band 32c' are allowed to have a common frequency band 33c' as shown in FIG. 4(2). This means that light having a switch frequency 34c which is introduced to the main waveguide and present within the common frequency band 33c' can be turned on/off in the branch waveguide 17 or the main waveguide 15 on the third area 123 side by turning on/off the control light in the same manner with the first embodiment.

Figure 5:
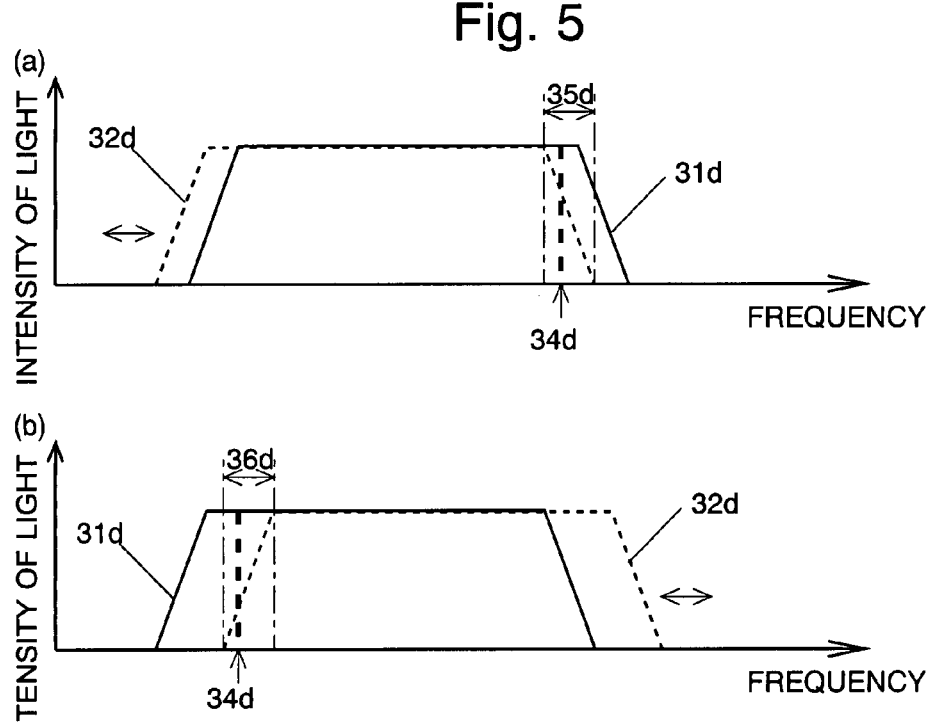
FIG. 5 is a graph showing the frequency band for passing through the waveguide of the two-dimensional photonic crystal according to the present embodiment (when intensity of light extracted from a main waveguide is controlled).

As shown in FIG. 5, in variable bands 35d and 36d that are included in a second passing frequency band 32d and regarded as a frequency band in the vicinity of the end of a high frequency side and a low frequency side, the intensity of light passing through the waveguide is changed by a slight frequency change. This is used to shift the second passing frequency band 32d by irradiating the control light to the second area so that the variable band 35d or 36d approaches the switch frequency 34d within a first passing frequency band 31d. Therefore, an intensity of light extracted from the main waveguide on the third area side or the branch waveguide can be controlled.

Described next will be the result of experiments on an operation as an optical switch in the first embodiment shown in FIG. 1. A wavelength in vacuum is expressed below in place of a frequency.

Figure 6:
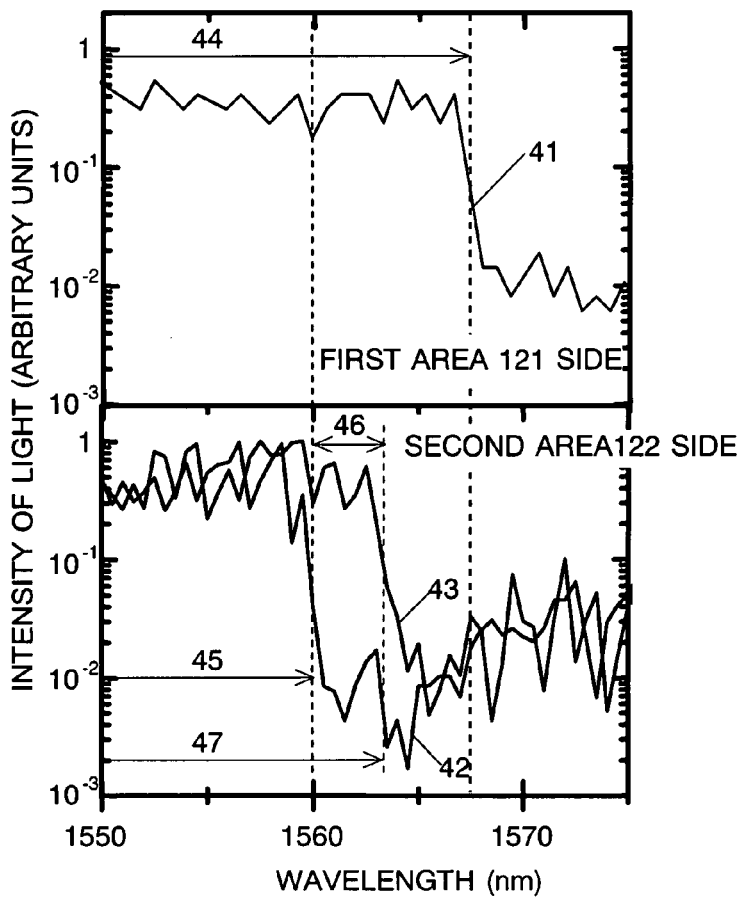
FIG. 6 is a graph showing the experiment results of the frequency band for passing through the waveguide of the two-dimensional photonic crystal according to the present embodiment.

A slab made of Si with a thickness of 250 nm, a refractive index of 3.4, and a change ratio of the refractive index of $1.86 \times 10^{-4} K^{-1}$ by temperatures is used for the body 11. The holes 131 in the first area 121 and the third area 123 are assumed to have a period of 410.0 nm and a diameter of 238 nm. The holes 132 of the second area 122 are also assumed to have a period of 413.0 nm and a diameter of 240 nm. FIG. 6 shows the result of measuring a passing wavelength band of the waveguides in each of the first area 121 and the second area 122. A spectrum 41 is a spectrum of light within the main waveguide 15 of the first area 121, a spectrum 42 is a spectrum of light within the main waveguide 15 of the second area 122 in a state before irradiating a laser beam, and a spectrum 43 is a spectrum of light within the main waveguide 15 of the second area 122 in a state after irradiating a laser beam. A passing wavelength band 44 of the main waveguide 15 within the first area 121 is in a range of 1505 to 1568 nm, and a passing wavelength band 45 of the main waveguide 15 within the second area 122 obtained before irradiating a laser beam is in a range of 1501 to 1560 nm. Accordingly, a common wavelength band of 1505 to 1560 nm is obtained. It is omitted to show a wavelength band equal to or less than 1550 nm.

When light having a wavelength of 1400 to 1600 nm is introduced from the first area 121 side to the main waveguide 15 without irradiating the control light to the control light irradiating area 18 and the intensity of light extracted from the third area 123 side is measured, light having the above-described common wavelength band is detected and light having wavelengths other than the wavelength is not detected. Next, when a similar measurement is performed by irradiating a GaN laser beam (i.e. control light) having a wavelength of 405 nm and intensity of 3 mW to the control light irradiating area 18 with a diameter of about 3 μm, light whose wavelength band 46 is 1560 to 1563 nm is detected from the main waveguide 15 on the third area 123 side in addition to the above-described common wavelength band. This is because the passing wavelength band of the second area is shifted to a longer wavelength side by leaser beam irradiation as shown in a shifted band 47.

Next, experiments on an optical switch were carried out by introducing a laser beam having a central wavelength of 1560 nm and a half value width of 0.2 nm from the main waveguide 15 on first area 121 side. This leaser beam is introduced into the branch waveguide when the control light is turned off and extracted from the main waveguide 15 on the third area 123 side when the control light is turned on. At this time, a period of time required to perform the switching (i.e. switching speed) is about 20 μsec. It is about 1/100 of a switching speed obtained from the conventional bulk-type thermo-optical optical switch.

A change ratio of the refractive index obtained from an amount of a common wavelength band increased by a control light irradiation and an Si temperature is used to estimate that a temperature of the second area 122 is increased by 60 degrees Celsius due to the irradiated control light in this experiment. If an output of the control light is further increased to expand a temperature change of the second area 122, a wavelength band to allow light switching can be further made larger.

Figure 7:
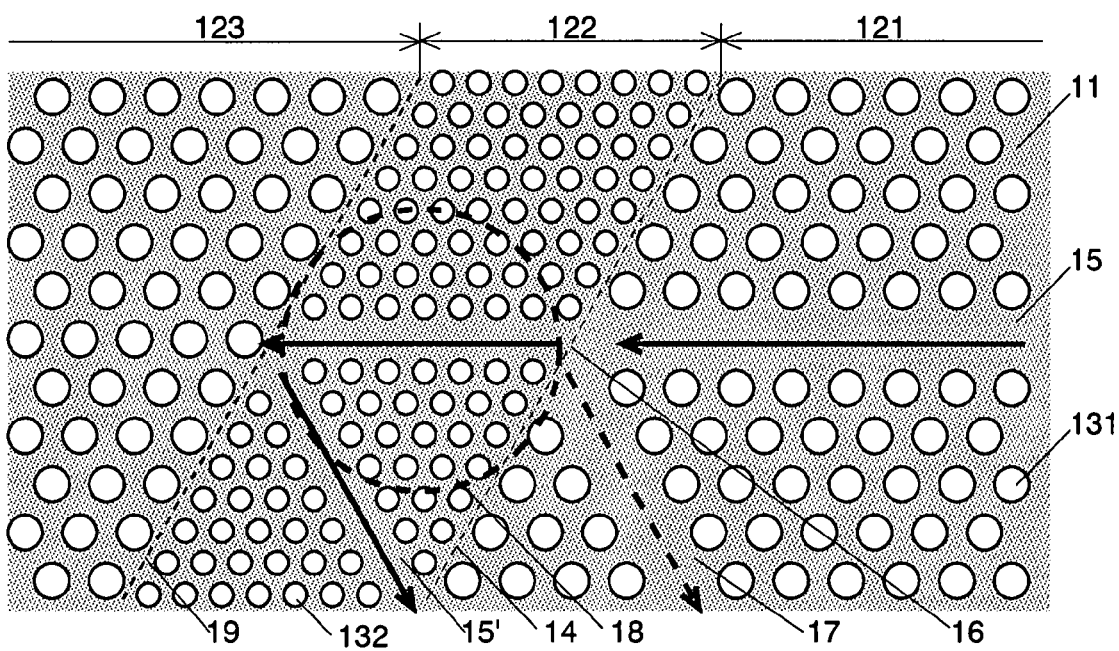
FIG. 7 is a plane view showing a modified example of the two-dimensional photonic crystal according to the first embodiment.

As shown in FIG. 7, the main waveguide 15 may be bent to become parallel to the branch waveguide 17 within the second area 122 in the two-dimensional photonic crystal of the present embodiment. Therefore, light can be extracted from the branch waveguide 17 and the main waveguide 15 in a mutually adjacent state.

Although explanation was made in the present embodiment using an example of changing the refractive index by irradiating the laser beam to the second area, the light switching can be performed by changing the refractive index of the first area in the same manner with the above-described embodiment.

The invention claimed is:

1. A two-dimensional photonic crystal comprising:
   a) a first area and a second area adjacent to each other within a slab-shaped body and provided with a different refractive index distribution;
   b) a main waveguide obliquely intersecting a boundary between the areas, having a first passing frequency band in the first area and a second passing frequency band in the second area, in which the first passing frequency band and the second passing frequency band have a common passing frequency band;
   c) a branch waveguide branched from a crossing point between the main waveguide and the boundary into the first area; and
   d) refractive index changing means for changing refractive index distribution of the first area or the second area so as to change the common passing frequency band.

2. The two-dimensional photonic crystal according to claim 1, wherein the area whose refractive index is changed is the second area.

3. An optical intensity modulator made by the two-dimensional photonic crystal according to claim 2.

4. The two-dimensional photonic crystal according to claim 1, wherein the refractive index distribution of the second area is realized by proportionally expanding or proportionally reducing the refractive index distribution of the first area.

5. The two-dimensional photonic crystal according to claim 1, wherein the refractive index changing means uses any one of a thermo-optical effect, an electro-optical effect, a magneto-optical effect, a nonlinear optical effect, and an application effect.

6. The two-dimensional photonic crystal according to claim 5, wherein the refractive index changing means heats the second area by irradiating a laser beam to the area.

7. The two-dimensional photonic crystal according to claim 5, wherein the refractive index changing means is a heating member provided in the vicinity of the second area.

8. An optical switch made by the two-dimensional photonic crystal according to claim 1.

9. An electro-optical modulator made by the two-dimensional photonic crystal according to claim 1, wherein the refractive index changing means changes the refractive index distribution of the second area by a change of an electric signal from the outside.

10. A two-dimensional photonic crystal comprising:
    a) a first area and a second area adjacent to each other within a slab-shaped body and provided with different refractive index distribution;

b) a main waveguide obliquely intersecting a boundary between the areas, having a first passing frequency band in the first area and a second passing frequency band in the second area;

c) a branch waveguide branched from a crossing point between the main waveguide and the boundary into the first area; and d) refractive index changing means for changing a refractive index distribution of the first area or the second area so that the first passing frequency band and the second passing frequency band have a common passing frequency band.

11. The two-dimensional photonic crystal according to claim 10, wherein the area whose refractive index is changed is the second area.

12. An optical intensity modulator made by the two-dimensional photonic crystal according to claim 11.

13. The two-dimensional photonic crystal according to claim 10, wherein the refractive index distribution of the second area is realized by proportionally expanding or proportionally reducing the refractive index distribution of the first area.

14. The two-dimensional photonic crystal according to claim 10, wherein the refractive index changing means uses any one of a thermo-optical effect, an electro-optical effect, a magneto-optical effect, a nonlinear optical effect, and an application effect.

15. The two-dimensional photonic crystal according to claim 14, wherein the refractive index changing means heats the second area by irradiating a laser beam to the area.

16. The two-dimensional photonic crystal according to claim 14, wherein the refractive index changing means is a heating member provided in the vicinity of the second area.

17. An optical switch made by the two-dimensional photonic crystal according to claim 10.

18. An electro-optical modulator made by the two-dimensional photonic crystal according to claim 10 and characterized in that the refractive index changing means changes the refractive index distribution of the second area by a change of an electric signal from the outside.

* * * * *